United States Patent
Ullrich et al.

(10) Patent No.: US 12,459,598 B2
(45) Date of Patent: Nov. 4, 2025

(54) FOLDABLE VEHICLE AND COMPONENTS THEREOF

(71) Applicant: Plus Rides, Inc., New York, NY (US)

(72) Inventors: Theodore Ullrich, New York, NY (US); Jackson Zhao, New York, NY (US); Joe Gonzalez, New York, NY (US); Jesse Klein, New York, NY (US); David Azar Serur, New York, NY (US); Pepin Gelardi, New York, NY (US)

(73) Assignee: PLUS RIDES, INC., New York, NY (US)

( * ) Notice: Subject to any disclaimer, the term of this patent is extended or adjusted under 35 U.S.C. 154(b) by 541 days.

(21) Appl. No.: 18/048,439

(22) Filed: Oct. 20, 2022

(65) Prior Publication Data

US 2023/0126935 A1  Apr. 27, 2023

Related U.S. Application Data

(60) Provisional application No. 63/270,524, filed on Oct. 21, 2021.

(51) Int. Cl.
*B62K 15/00* (2006.01)
*B62K 3/00* (2006.01)

(52) U.S. Cl.
CPC ............ *B62K 15/006* (2013.01); *B62K 3/002* (2013.01)

(58) Field of Classification Search
CPC .................................................... B62K 15/006
See application file for complete search history.

(56) References Cited

U.S. PATENT DOCUMENTS

| | | | |
|---|---|---|---|
| 7,249,779 B2 | 7/2007 | Ehrenreich et al. | |
| 7,597,333 B2* | 10/2009 | Stillinger | A63C 17/012 280/87.01 |
| 7,784,803 B2 | 8/2010 | Griggs | |
| 8,720,918 B2 | 5/2014 | Liao | |
| 9,073,594 B2 | 7/2015 | Sluijter et al. | |
| 9,440,698 B2 | 9/2016 | Dadoosh et al. | |
| 9,718,512 B2 | 8/2017 | Mei et al. | |
| 9,873,476 B2 | 1/2018 | Etzelsberger et al. | |
| 2006/0103097 A1* | 5/2006 | Chen | B62K 15/00 280/87.05 |
| 2015/0084312 A1* | 3/2015 | Schreuder | B62K 3/002 280/639 |
| 2016/0347402 A1* | 12/2016 | Hadley | B62K 11/00 |

FOREIGN PATENT DOCUMENTS

| | | | | |
|---|---|---|---|---|
| CN | 108001594 B | * | 4/2020 | ........... B62K 15/006 |
| WO | WO-2023031321 A1 | * | 3/2023 | ............. B62K 15/00 |

OTHER PUBLICATIONS

Instragram posts, https://www.instagram.com/plus.rides/, Nov. 13, 2020-Oct. 13, 2021, pp. 1-13.

* cited by examiner

*Primary Examiner* — Valentin Neacsu
*Assistant Examiner* — Hosam Shabara
(74) *Attorney, Agent, or Firm* — Dilworth IP, LLC

(57) ABSTRACT

The present disclosure relates to a foldable vehicle and to several exemplary components thereof, which may comprise a hinge cassette and a rear wheel brake assembly among other components. In some examples, the vehicle has a folded configuration and an unfolded configuration, where in the folded configuration, the at least one rear wheel nests within the at least one opening.

17 Claims, 10 Drawing Sheets

FOLDABLE VEHICLE AND COMPONENTS THEREOF

RELATED APPLICATIONS

The present application claims the benefit of U.S. Provisional Application No. 63/270,524 filed Oct. 21, 2021, which is incorporated by reference herein in its entirety for all purposes.

FIELD

The present disclosure relates to a foldable electric vehicle and to several exemplary components thereof.

BACKGROUND

Micro-mobility vehicles have been growing in popularity in recent years, particularly in urban areas. However, many shared vehicles on the market are not designed to collapse easily. Furthermore, when these vehicles are folded, they are difficult to carry because the vehicles have no handles, are imbalanced, and very heavy. In addition, foldable vehicles can be bulky and difficult to store. A foldable vehicle that solves these problems is needed.

SUMMARY

To solve at least the above technical problems, a compact foldable vehicle, a hinge for the compact foldable vehicle, and a rear wheel brake assembly for the compact foldable vehicle, according to some embodiments of the present disclosure, are described.

One or more embodiments of the vehicle include at least one front wheel; at least one rear wheel; a handlebar; and a frame, where at least one portion of the frame comprises at least one opening. In some examples, the vehicle has a folded configuration and an unfolded configuration, where in the folded configuration, the at least one rear wheel nests within at least one opening. In some embodiments, the vehicle includes a plurality of front wheels; a plurality of rear wheels; the handlebar; and the frame, where at least one portion of the frame comprises a plurality of openings, where in the folded configuration, the plurality of rear wheels nests within the plurality of openings.

One or more embodiments of present disclosure relate to a hinge cassette that may be present on the vehicle. In some embodiments, the hinge cassette includes at least one tumbler, at least one spring, at least one pin, and at least one actuator where the at least one actuator is configured to rotate the at least one pin, and where upon rotation of the at least one pin, the at least one spring is configured to expand and compress, thereby activating the hinge cassette. In some embodiments, activating the hinge cassette allows for folding and unfolding of the vehicle.

One or more embodiments of present disclosure relate to a rear wheel brake assembly that may be present on the vehicle. One or more embodiments of the rear wheel brake assembly include a fender, where the fender is configured to be disposed over a top of the at least one rear wheel; a drum brake; and a linkage arm, where the linkage arm is configured to be disposed over at least one surface of the fender, and the fender and the linkage arm are configured to move in tandem, thereby actuating the drum brake.

DETAILED DESCRIPTION

Figure 1A:
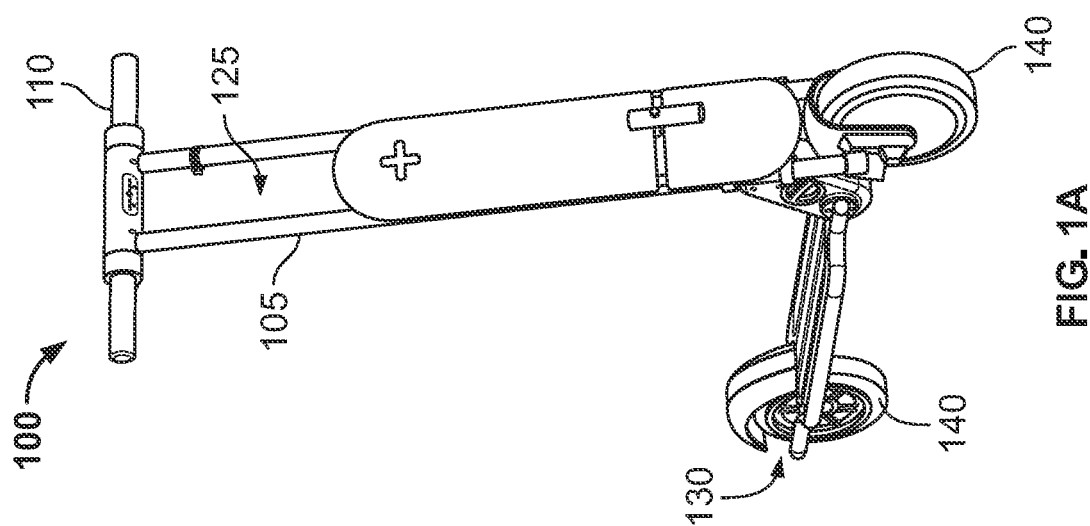
FIGS. 1A-1C show examples of a vehicle according to aspects of the present disclosure.
Figure 1B:
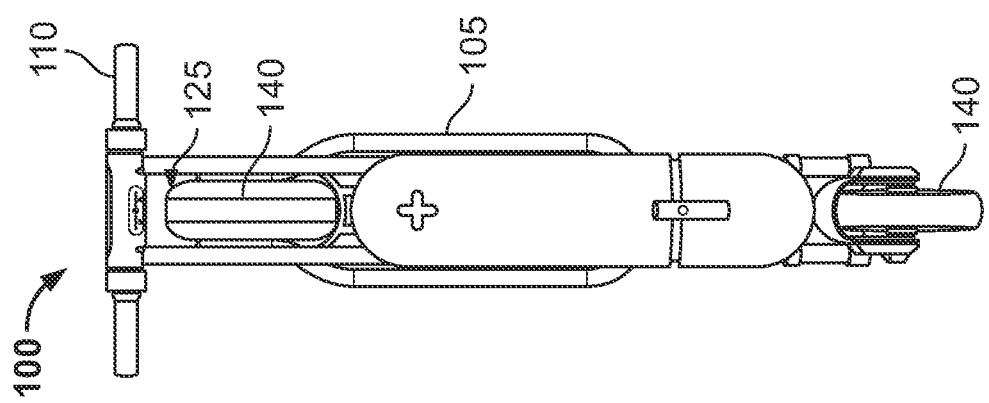
Figure 1C:
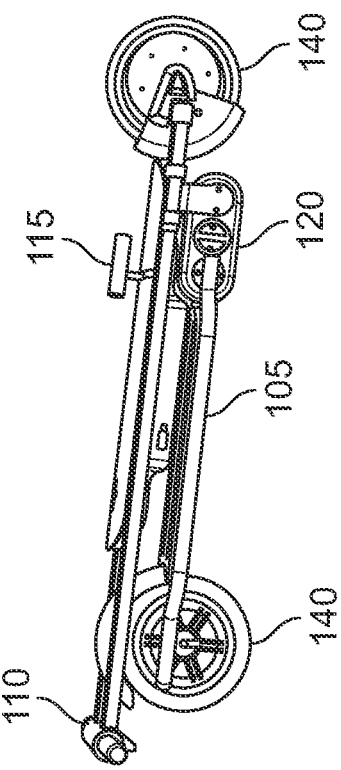

FIGS. 1A-1C show non-limiting examples of a vehicle 100 according to aspects of the present disclosure. In some examples, the vehicle 100 is a bicycle, a tricycle, a wheelchair, a shopping cart, a stroller, a rickshaw, a pedicab, or any combination or electric vehicle 100 thereof. In one example, the vehicle 100 is a micro-mobility vehicle. As used in the present disclosure, a "micro-mobility vehicle" is defined as a vehicle having a maximum speed of 30 mph or less. Examples of micro-mobility vehicles include, but are not limited to, bicycles, e-bikes, electric scooters, electric skateboards, shared bicycles, and electric pedal assisted bicycles. In some examples, the vehicle 100 is an electric vehicle 100 is a scooter, such as, but not limited to an electric scooter.

In certain examples, the vehicle 100 has a maximum weight of 200 lbs, 100 lbs, 50 lbs, 45 lbs, 35 lbs, 30 lbs, 25 lbs, 20 lbs, 15 lbs, or 10 lbs. In some examples, the vehicle 100 has a weight in the range of 10 lbs to 50 lbs, 15 lbs to 50 lbs, 20 lbs to 50 lbs, 25 lbs to 50 lbs, 30 lbs to 50 lbs, 40 lbs to 50 lbs, 45 lbs to 50 lbs, 10 lbs to 45 lbs, 10 lbs to 40 lbs, 10 lbs to 35 lbs, 10 lbs to 30 lbs, 10 lbs to 25 lbs, 10 lbs to 15 lbs, 10 lbs to 20 lbs, 10 lbs to 15 lbs, 15 lbs to 45 lbs, 20 lbs to 40 lbs, 25 lbs to 35 lbs, or any combination thereof. In some implementations, the vehicle 100 exhibits a maximum speed of 30 mph, 20 mph, 15 mph, 10 mph, or 5 mph. In some implementations, the vehicle 100 exhibits a speed ranging from 0 mph to 15 mph, 0 mph to 10 mph, 0 mph to 5 mph, 5 mph to 15 mph, 10 mph to 15 mph, 5 mph to 10 mph, or any combination thereof.

One or more aspects of a vehicle 100 described herein include at least one front wheel 135, at least one rear wheel 140, a handlebar 110, and a frame 105. In one aspect, vehicle 100 includes frame 105, front wheel 135, and rear wheel 140. In one aspect, frame 105 includes handlebar 110, lateral handle 115, hinge 120, opening 125, and rear wheel brake assembly 130.

In some examples, at least one portion of the frame 105 includes at least one opening 125. In some examples, the at least one portion of the frame 105 that includes the at least one opening 125 is "U shaped" or "V shaped." In some examples, the at least one portion of the frame 105 that includes the at least one opening 125 is "A shaped," "∀ shaped," "O shaped," "W shaped," "Δ shaped," "M shaped," "N shaped," or any combination thereof. In some examples, the at least one portion of the frame 105 that includes the at least one opening 125 is elliptical, circular, rectangular, square, trapezoidal, or any other shape.

In some implementations, the vehicle 100 has an unfolded configuration, an example of which is shown in FIG. 1A. In some implementations, the vehicle 100 has a folded configuration, an example of which is shown in FIGS. 1B.-1C. In the folded configuration, the at least one rear wheel 140 may nest within the at least one opening 125. In one specific example, the at least one opening 125 may be "U shaped" or "V shaped" and the vehicle consists of a single rear wheel 140. In another specific example, the at least one opening 125 may be "W shaped" or "M shaped" and the vehicle consists of two rear wheels 140, each of which nests within a respective portion of the "W shaped" or "M shaped" opening.

In addition, in some examples, in the folded configuration, the handlebar 110 may hover directly above the at least one rear wheel 140, as shown in FIGS. 1B.-1C. In some examples, the handlebar 110 is positioned over a center of mass of the vehicle 100 in the folded position.

Figures 5A, 5B:
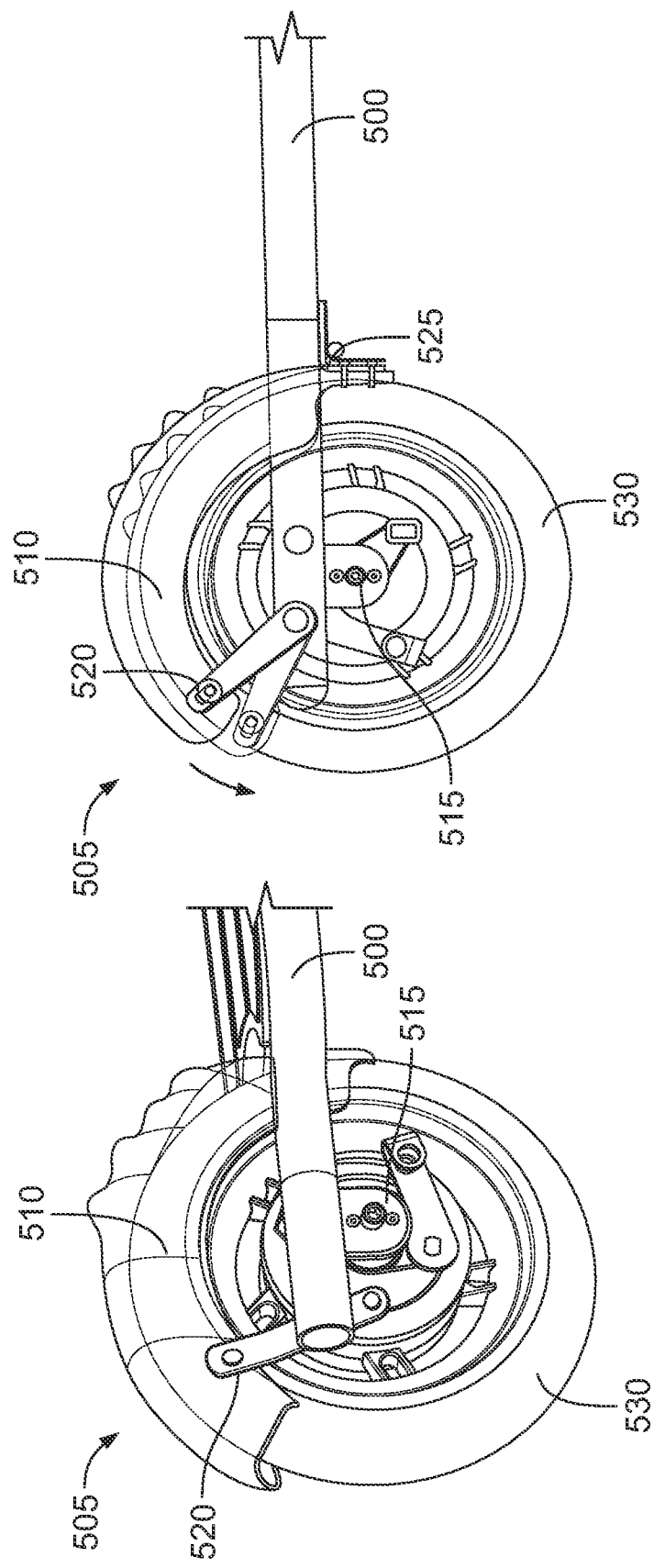
FIGS. 5A and 5B show examples of a rear wheel brake assembly according to aspects of the present disclosure.

In some aspects, the vehicle 100 further includes a rear wheel brake assembly 130 (e.g., as further described herein, for example, with reference to FIGS. 5A and 5B). In some aspects, the vehicle 100 may include a lateral handle 115 which may be used by a user of the vehicle 100 to transport or carry the vehicle 100 when the vehicle 100 is in the folded configuration. In some examples, the lateral handle 115 may be used to carry the vehicle 100 like a briefcase while in the folded configuration. In some examples, in the folded configuration, the handlebar 110 can be used to carry the vehicle 100 like a rolling suitcase with the user holding the handlebar 110, with the rear wheel 140 suspended in the air, and with the vehicle 100 rolling on the front wheel 135.

In some examples, lateral handle 115 may be "T-shaped." In some examples, lateral handle 115 may be "U shaped," "W shaped," "0-shaped" shaped like a bracket, some other shape, or any combination thereof.

Figure 2C:
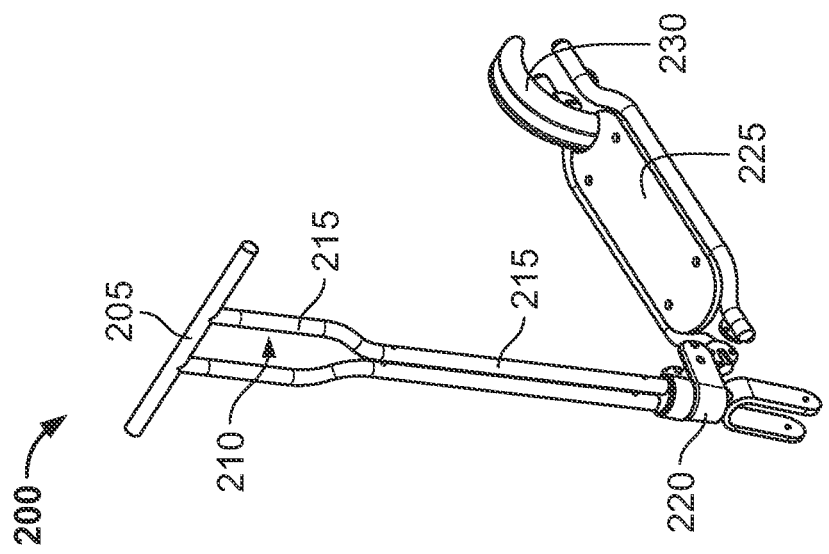
FIGS. 2A-2C show examples of a frame according to aspects of the present disclosure.
Figure 2B:
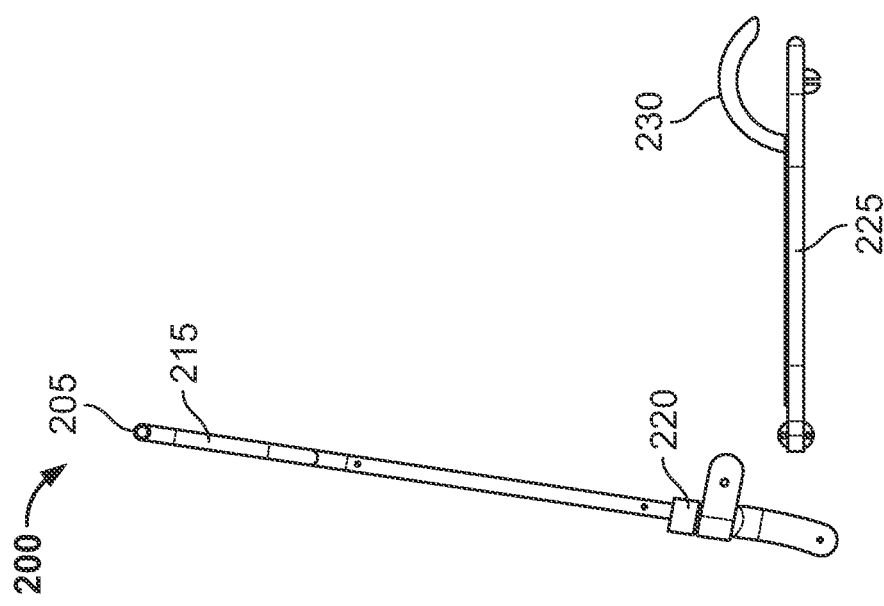
Figure 2A:
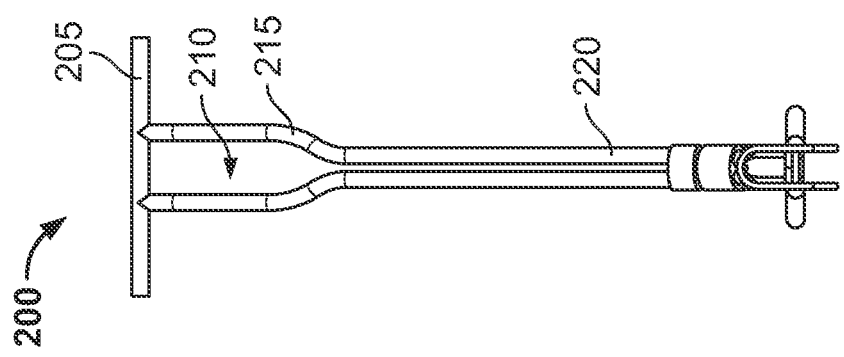

FIGS. 2A-2C show non-limiting examples of a frame 200 according to aspects of the present disclosure. In one aspect, frame 200 includes handlebar 205, opening 210, stem 215, collar 220, base 225, and rear wheel brake assembly 230.

Frame 200 is an example of, or includes aspects of, the corresponding element described with reference to FIGS. 1A-1C, 5A, 5B, and 6A-6D. Handlebar 205 is an example of, or includes aspects of, the corresponding element described with reference to FIGS. 1A-1C, 3A, 3B, and 6A-6D. Opening 210 is an example of, or includes aspects of, the corresponding element described with reference to FIGS. 1A-1C and 6A-6D. Collar 220 is an example of, or includes aspects of, the corresponding element described with reference to FIGS. 6A-6D. Rear wheel brake assembly 230 is an example of, or includes aspects of, the corresponding element described with reference to FIGS. 1A-1C, 5A, and 5B.

In some aspects, the frame 200 includes a plurality of hollow tubular members. In some examples, the frame 200, the plurality of hollow tubular members, or both comprises, an alloy, such as but not limited to, steel or brass. In one specific example, the steel may be Q235 steel. In some examples, the frame 200, the plurality of hollow tubular members, or both comprises aluminum. In some examples, the frame 200 comprises an aluminum alloy, such as but not limited to a 1XXX series aluminum alloy, a 2XXX series aluminum alloy, a 3XXX series aluminum alloy, a 4XXX series aluminum alloy, a 5XXX series aluminum alloy, a 6XXX series aluminum alloy, a series 7XXX aluminum alloy, or any combination thereof. Non-limiting examples of 6XXX series aluminum alloys include alloy 6063, alloy 6061, or alloy 6082. Non-limiting examples of 7XXX series aluminum alloys include alloy 7075. In one non-limiting example, the aluminum alloy is A380. In some examples, the frame 200 comprises at least one chemical element chosen from: manganese, zinc, titanium, copper, tin, silicon, carbon, hydrogen, oxygen, iron, magnesium or any combination thereof. In some examples, the frame 200 may comprise carbon fiber or a polymer (e.g., polycarbonate or acrylonitrile butadiene styrene (ABS)).

In the non-limiting example shown, the stem 215 is attached to the handlebar 205. In some examples, at least one portion of the stem 215 may be orthogonal to the handlebar 205, such as, but not limited to the example of FIG. 2A and FIG. 2C where the portions of the stem 215 that are proximal to the handlebar 205 are also orthogonal to the handlebar 205.

In some embodiments, and the base 225 is connected to the stem 215. In some aspects, the stem 215 folds toward the base 225 in a transition between an unfolded configuration of a vehicle and a folded configuration of the vehicle. In some aspects, the stem 215 is the at least one portion of the frame 200 that includes the at least one opening 210. In some implementations, the frame 200 includes an upper portion that includes the at least one opening 210 and a lower portion that does not include an opening, as shown in FIG. 2A and FIG. 2C. In some examples, the stem 215 may comprise a plurality of tubular members (e.g., as shown in FIG. 2A and FIG. 2C) or may consist of a singular tubular member.

In some aspects, the base 225 includes a deck, where the deck is configured to support at least one user of the vehicle while the at least one user rides or stands on the vehicle while in the unfolded configuration. In one example, the base 225 is integral with the deck. In other examples, the deck is separate from the base 225. In some aspects, the deck is sized so as to fit within an opening of the base 225, as shown in FIG. 2C. In some aspects, the deck is mounted on the base 225 (e.g., by washers). In some examples, the base 225, the deck, or a combination thereof, is configured to support at least one user. In some examples, the base 225, the deck, or a combination thereof, is configured to support a plurality of items.

In some aspects, the base 225 is pivotably connected to the stem 215 by a hinge (such as, but not limited to a hinge cassette as described in more detail herein, for example, with reference to FIGS. 4A-4F). In some examples, the base 225 may comprise a wooden deck. In other examples, the base 225 or the deck may comprise at least one metal (e.g., an aluminum alloy as described herein), at least one polymer (e.g., polycarbonate or ABS), or any combination thereof.

Some examples of the vehicle further include a collar 220. In some examples, the collar 220 connects the stem 215 to the at least one front wheel. In some examples, the collar 220 connects the stem 215 to the at least one front wheel by at least one fastener (e.g., a bolt, a screw, a nut, some other fastener, or any combination thereof). In some aspects, the collar 220 further connects the stem 215 to the hinge (e.g., by at least one fastener). In some aspects, the base 225 is also connected to the hinge. In this regard, an exemplary collar 220 may include multiple sets of openings—a first set of openings configured to fasten the stem 215 to the at least one front wheel and a second set of openings configured to fasten the stem 215 to the hinge.

Figure 3B:
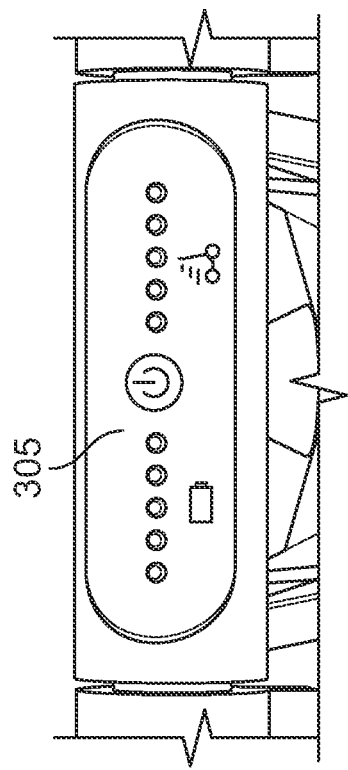
FIGS. 3A and 3B show examples of a handlebar display according to aspects of the present disclosure.
Figure 3A:
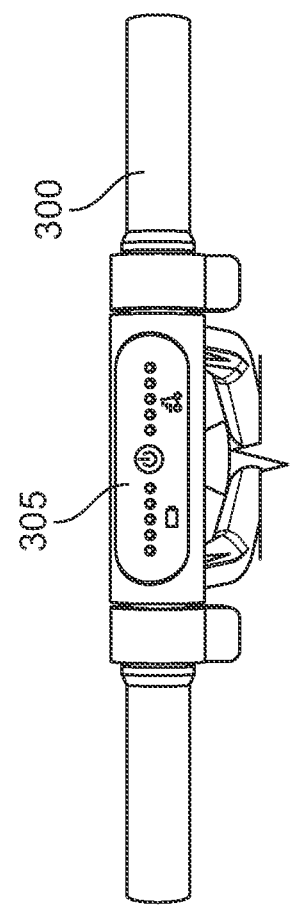

FIGS. 3A and 3B show non-liming examples of a handlebar 300 display 305 according to aspects of the present disclosure. In some aspects, the handlebar 300 includes a display 305. The display 305 may comprise a conventional monitor, a monitor coupled with an integrated display 305, an integrated display 305 (e.g., an LCD display 305), or other mechanism configured for viewing associated data or processing information. Output devices other than the display 305 can be used, such as a mobile device, other computers or data storage devices, and computer networks. In some examples, the display 305 is located between handles on the handlebar 300. In some examples, the display 305 displays speed and battery life in dot-gauge format. In certain implementations, the display 305 does not use numbers or words are such that the display 305 can work across different languages. In some examples, the display 305 displays speed of the vehicle proximal to an accelerator trigger.

FIGS. 4A-4F show non-liming examples of a hinge cassette 400 according to aspects of the present disclosure. In some examples, the hinge cassette 400 aligns the rear wheel and a fender with the opening of the frame. In some examples, the hinge cassette 400 automatically turns the scooter power on or off based on a position of the hinge cassette 400.

In some examples, the hinge cassette 400 includes at least one tumbler 405, at least one spring 415, at least one spring housing 410, and at least one actuator 420.

In some aspects, the hinge cassette 400 further includes at least one pin 425. In some examples, the at least one pin 425 is configured to be engaged by the actuator 420 to initiate the transition between the unfolded configuration and the folded configuration. For instance, in some examples, at least one user may manually rotate a knob on the hinge cassette 400 so as to engage the at least one actuator 420. In some examples, engagement of the at least one actuator 420 is configured to initiate the transition between the unfolded configuration and the folded configuration. In some examples, such as the examples of FIGS. 4C & 4F, engagement of the at least one pin 425 compresses the at least one spring 415. Compressing the at least one spring 415 may trigger the transition from the unfolded configuration to the folded configuration. In some examples, In some examples, such as the examples of FIGS. 4C & 4F, engagement of the at least one pin 425 can also expand the at least one spring 415. Expanding the at least one spring 415 may trigger the transition from the folded configuration to the unfolded configuration. In certain implementations, the at least one pin 425 is configured to engage with the at least one tumbler 405 to maintain the vehicle in the unfolded configuration. In some examples, the at least one spring 415 contacts the at least one pin 425. In some examples, the at least one spring 415 is in direct contact with the actuator 420. In some cases, the at least one spring 415 expands upon initiation of the transition between the unfolded configuration (e.g., of a compact foldable vehicle described herein) and the folded configuration (e.g., of a compact foldable vehicle described herein).

In some examples, the at least one spring 415 surrounds the at least one tumbler 405. In some examples, the at least one spring 415 is a plurality of springs 415, with a first spring 415 or a first plurality of springs 415 surrounding the at least one tumbler 405 and a second spring 415 or a second plurality of springs 415 in contact with the at least one pin 425 (see, e.g., FIGS. 4C & 4F). In some examples, the at least one spring housing 410 envelops the at least one tumbler 405 and the at least one spring 415.

Figure 4A:
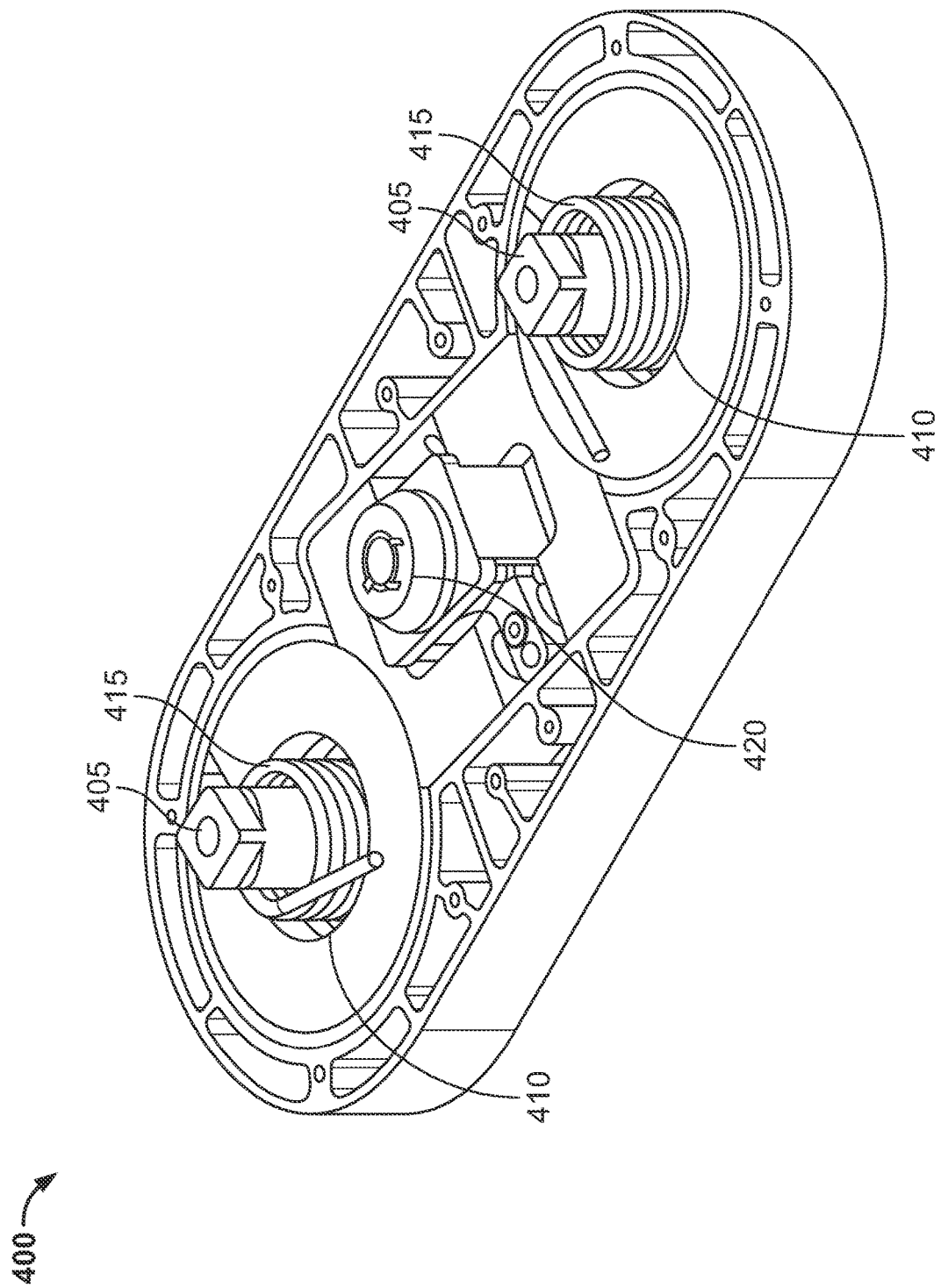
FIGS. 4A-4F show examples of a hinge cassette according to aspects of the present disclosure.
Figure 4B:
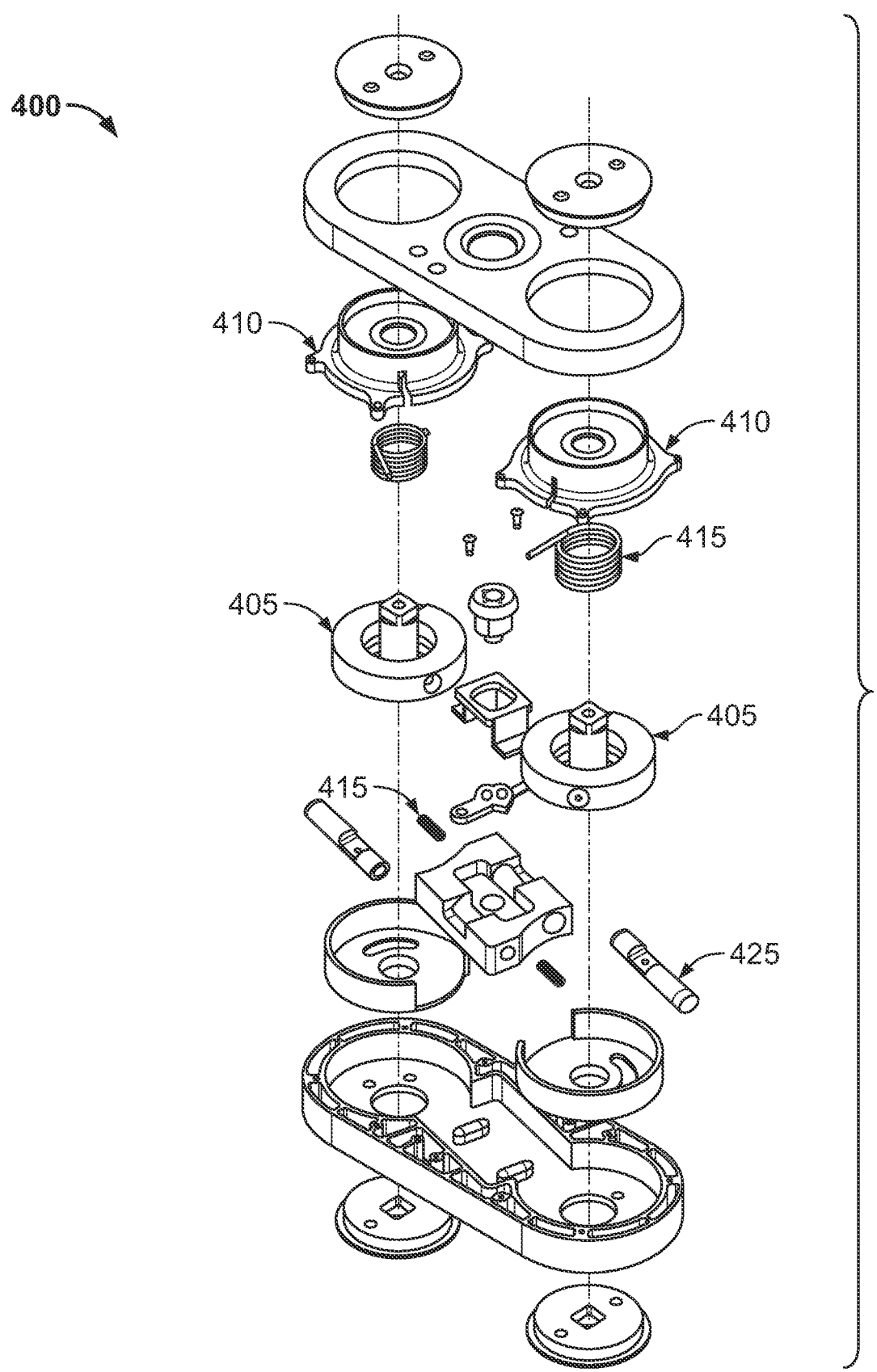
Figure 4C:
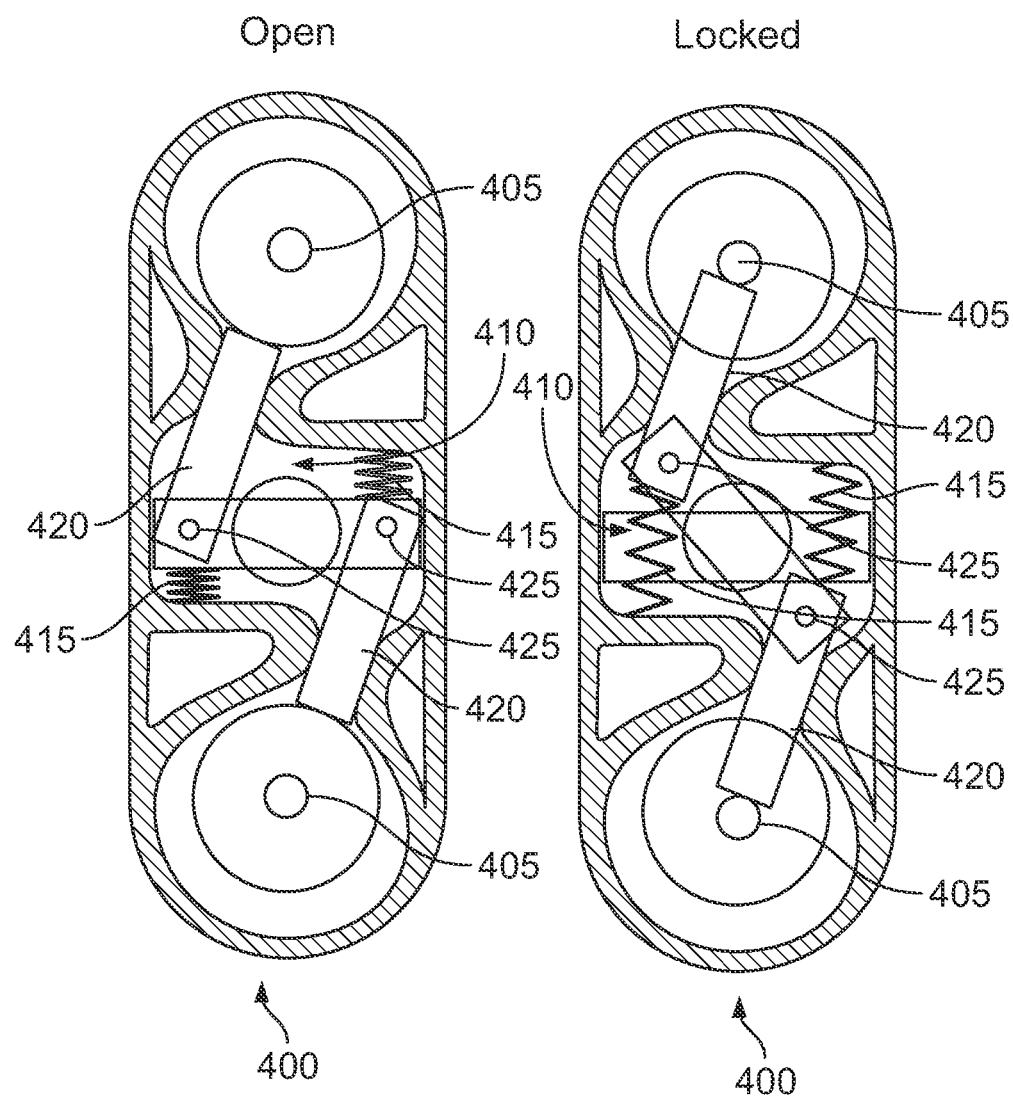
Figures 4D, 4E, 4F:
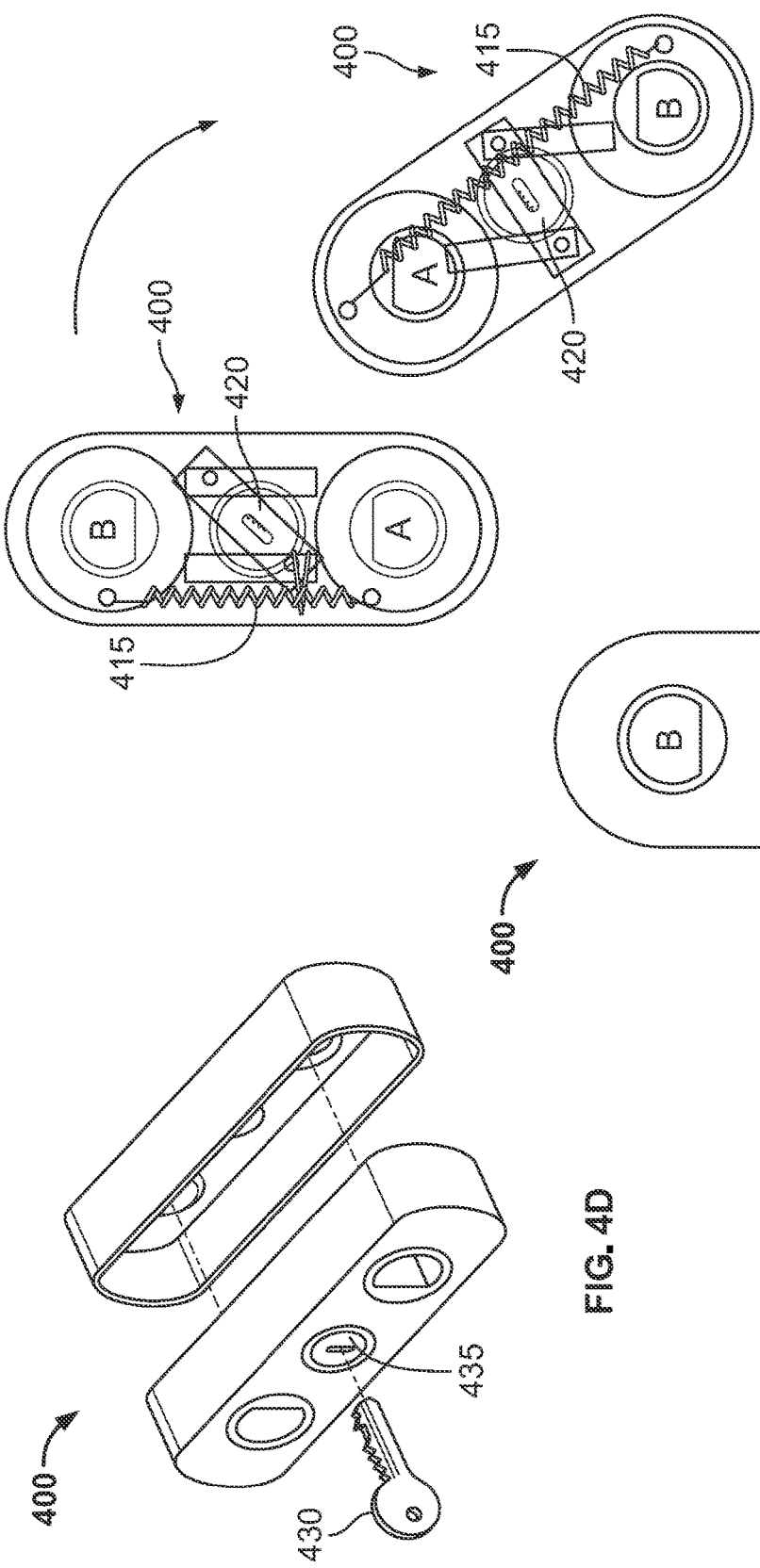

In an additional aspect, hinge cassette 400 includes tumbler 405, spring housing 410, spring 415, actuator 420, pin 425, key 430, and lock 435. As shown in FIGS. 4D-4E, the key 430 and the lock 435 may serve an analogous function to the knob, such that upon insertion of the key 430, the lock 435 is configured to engage the actuator 420 to initiate the transition between the unfolded configuration and the folded configuration. Accordingly, the insertion of the key 430 and turning of the lock 435 by the user may function as an alternative to rotating the knob. Accordingly, in some embodiments, the insertion of the key 430 and turning of the lock 435 may expand and compress the spring as shown in FIG. 4F. In some examples, locking the vehicle using the key 430 may prevent folding or unfolding of the vehicle, thereby protecting the vehicle from being used by others.

FIGS. 5A and 5B show non-liming examples of a rear wheel brake assembly 505 according to aspects of the present disclosure. One or more aspects of the rear wheel brake assembly 505 described herein include a fender 510, a drum brake 515, and a linkage arm 520. In some examples, the rear wheel brake assembly 505 includes a fastener 525 and the at least one rear wheel 530. In certain examples, the rear wheel brake assembly 505 provides equivalent stopping power to a brake cable system. In certain examples, the rear wheel brake assembly 505 removes the need to provide cabling between the rear wheel and the handlebar. In some implementations, the fender 510 does not directly contact the at least one rear wheel 530. Instead, the linkage arm 520 is configured to suspend the fender 510 above the at least one rear wheel 530. Such a configuration may minimize friction on the at least one rear wheel 530.

In some aspects, the fender 510 is configured to be disposed over a top of the at least one rear wheel 530 and at least a portion of the linkage arm 520 is configured to be disposed over at least one surface of the fender 510. Further, in some aspects, the fender 510 and the linkage arm 520 may be configured to move in tandem, thereby actuating the drum brake 515. In some examples, the fender 510 and the linkage arm 520 may actuate the drum brake 515 when at least one user manually engages the fender 510 (e.g., with the at least one user's foot). In some examples, the at least one user manually engages the fender 510 by pressing down on the fender 510. In one aspect, the rear wheel brake assembly 505 is connected to the frame 500 by at least one fastener 525. In some examples, the at least one fastener 525 functions as an anchor, allowing the fender 510 and the linkage arm 520 to function as a spring that is anchored by the at least one fastener 525. In some embodiments, the fender 510 may also be connected to the frame 500 by a spring, such as but not limited to a torsion spring. In some embodiments, the drum brake 515 comprises a spring that is configured to actuate the drum brake 515 upon engagement of the fender 510 by at least one user.

FIGS. 6A-6D show non-liming examples of a stand 600 according to aspects of the present disclosure. Vehicle 620 is an example of, or includes aspects of, the corresponding element described with reference to FIGS. 1A-1C. Frame 625 is an example of, or includes aspects of, the corresponding element described with reference to FIGS. 1A-1C, 2A-2C, 5A, and 5B. Handlebar 630 is an example of, or includes aspects of, the corresponding element described with reference to FIGS. 1A-1C, 2A-2C, 3A, and 3B. Opening 635 is an example of, or includes aspects of, the corresponding element described with reference to FIGS. 1A-1C, and 2A-2C. Lateral handle 640 is an example of, or includes aspects of, the corresponding element described with reference to FIGS. 1A-1C. Collar 650 is an example of, or includes aspects of, the corresponding element described with reference to FIGS. 2A-2C. Front wheel 655 is an example of, or includes aspects of, the corresponding element described with reference to FIGS. 1A-1C. Rear wheel 660 is an example of, or includes aspects of, the corresponding element described with reference to FIGS. 1A-1C, 5A, and 5B.

Figure 6B:
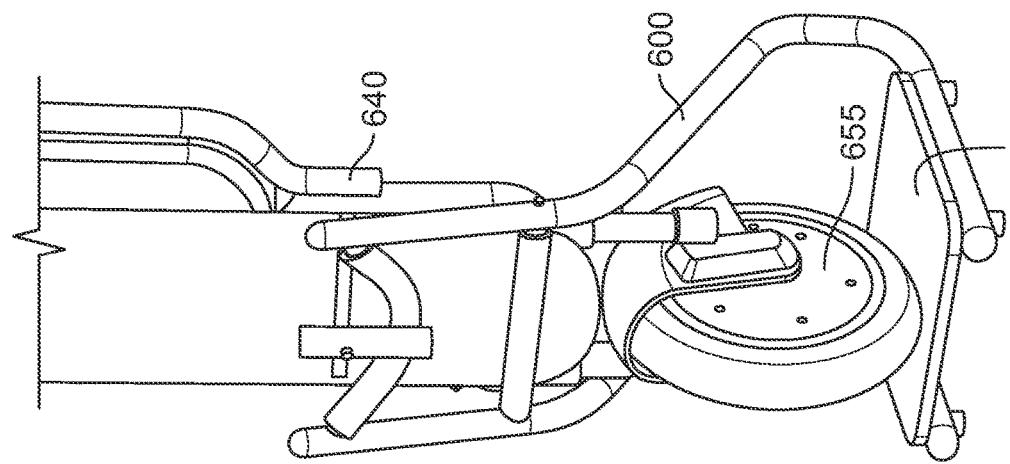
FIGS. 6A-6D show examples of a stand according to aspects of the present disclosure.
Figure 6A:
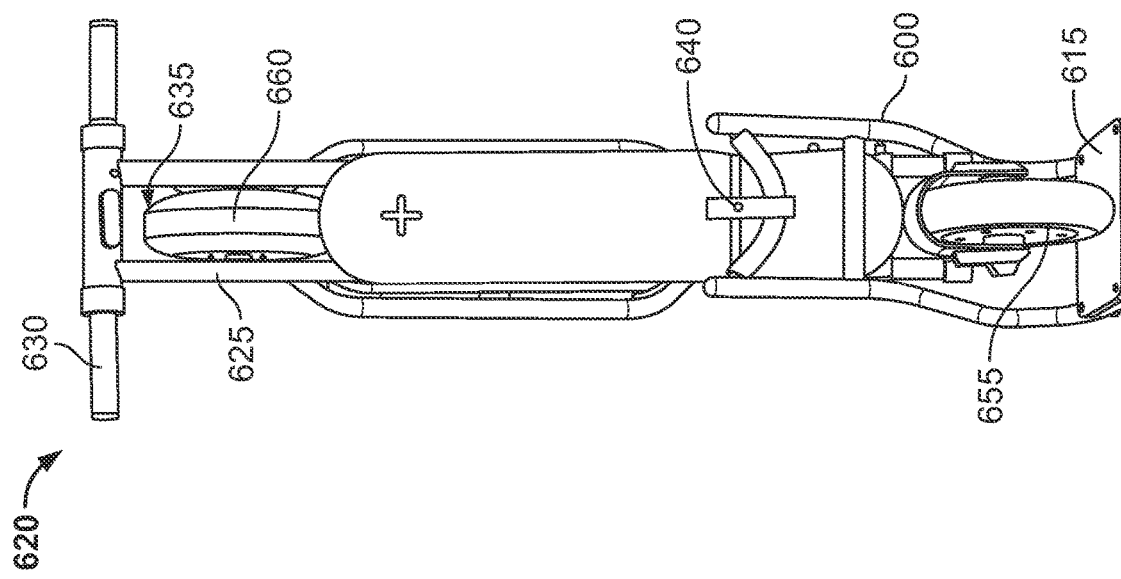

In some aspects, as shown, for example in FIGS. 6A and 6B, the stand 600 may be configured to maintain the vehicle 620 upright while in the folded configuration. In some aspects, the stand 600 is configured to engage with the lateral handle 640 to maintain the vehicle 620 upright. In some aspects, the stand 600 includes a platform 615. In certain implementations, the front wheel 655 is configured to rest on the platform 615 when the vehicle 620 is upright. In some aspects, the lateral handle 640 is located at a center of mass of the vehicle 620.

Figure 6D:
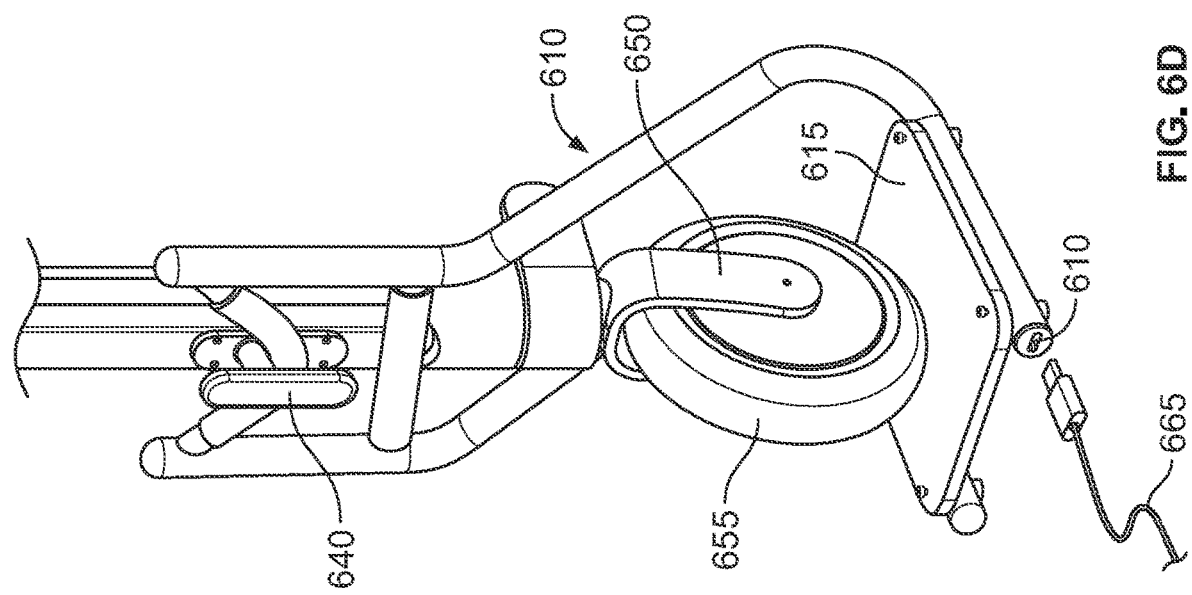
Figure 6C:
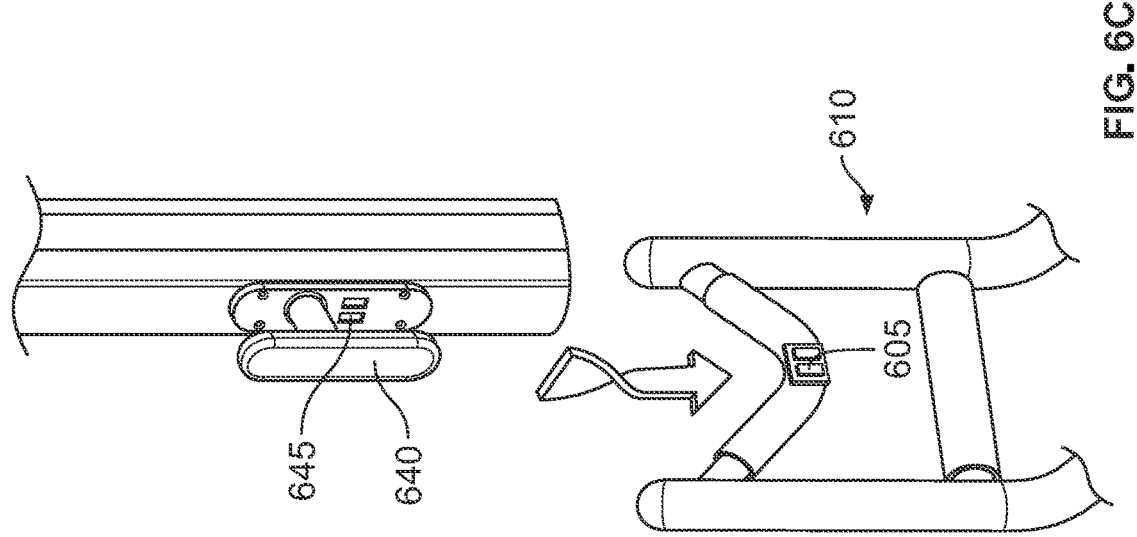

In some examples, the stand 600 includes a charging port 610 as shown in FIGS. 6C and 6D. In these examples, the stand 600 and the lateral handle 640 each may include an electrical conductor. For instance, the stand 600 may include a first electrical conductor 605 and the lateral handle 640 may include a second electrical conductor 645). In some aspects, upon engagement of the lateral handle 640 with the stand 600 and connection of the stand 600 to an electrical power source 665, each electrical conductor is configured to transmit electrical power to a battery, so as to charge the vehicle 620. In some examples, the battery may include galvanic cells, electrolytic cells, fuel cells, flow cells, saltwater cells, molten salt cells, and voltaic piles. In some examples, the battery may comprise a source of lithium ions. For instance, in one specific example, the battery may take the form of a battery system comprising a plurality of lithium phosphate ("LiPo") cells, which may be commercially obtained from Samsung®.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

The invention claimed is:

1. A vehicle comprising:
   at least one front wheel;
   at least one rear wheel;
   a handlebar;
   a frame, where at least one portion of the frame comprises at least one opening, where the frame further comprises:
      a stem, where the stem is attached to the handlebar; and
      a base, where the base is pivotably connected to the stem by a hinge cassette; and
   where the vehicle has a folded configuration and an unfolded configuration, where the stem folds toward the base in a transition between the unfolded configuration and the folded configuration, and where in the folded configuration, the at least one rear wheel nests within the at least one opening.

2. The vehicle of claim 1, further comprising a rear wheel brake assembly.

3. The vehicle of claim 1, where the stem is the at least one portion of the frame that comprises the at least one opening.

4. The vehicle of claim 1, where the base comprises a deck, where the deck is configured to support at least one user of the vehicle in the unfolded configuration.

5. The vehicle of claim 1, further comprising a collar, where the collar connects the stem to the at least one front wheel.

6. The vehicle of claim 5, where the collar further connects the stem to the hinge cassette.

7. The vehicle of claim 5, where the collar further connects the base to the hinge cassette.

8. The vehicle of claim 1, where the vehicle is an electric vehicle.

9. The vehicle of claim 1, where the vehicle is a scooter.

10. The vehicle of claim 1, where the vehicle is an electric scooter.

11. The vehicle of claim 1, where the handlebar further comprises a display.

12. The vehicle of claim 1, where in the folded configuration, the handlebar hovers directly above the at least one rear wheel.

13. The vehicle of claim 1, where the at least one portion of the frame that comprises the at least one opening is "U shaped" or "V shaped".

14. The vehicle of claim 1, where the frame comprises a plurality of hollow tubular members.

15. The vehicle of claim 1, further comprising a stand.

16. The vehicle of claim 1, further comprising a lateral handle.

17. The vehicle of claim 1, further comprising a battery.

* * * * *